US012282303B2

(12) United States Patent
Benoit et al.

(10) Patent No.: US 12,282,303 B2
(45) Date of Patent: Apr. 22, 2025

(54) DEEP CAUSAL LEARNING FOR CONTINUOUS TESTING, DIAGNOSIS, AND OPTIMIZATION

(71) Applicant: 3M INNOVATIVE PROPERTIES COMPANY, St. Paul, MN (US)

(72) Inventors: Gilles J. Benoit, Minneapolis, MN (US); Brian E. Brooks, St. Paul, MN (US); Peter O. Olson, Andover, MN (US); Tyler W. Olson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 474 days.

(21) Appl. No.: 17/431,533

(22) PCT Filed: Sep. 11, 2019

(86) PCT No.: PCT/IB2019/057673
§ 371 (c)(1),
(2) Date: Aug. 17, 2021

(87) PCT Pub. No.: WO2020/188331
PCT Pub. Date: Sep. 24, 2020

(65) Prior Publication Data
US 2022/0121971 A1 Apr. 21, 2022

Related U.S. Application Data

(60) Provisional application No. 62/818,816, filed on Mar. 15, 2019.

(51) Int. Cl.
*G05B 13/04* (2006.01)
*B60W 40/064* (2012.01)
(Continued)

(52) U.S. Cl.
CPC ........ *G05B 13/042* (2013.01); *B60W 40/064* (2013.01); *B60W 40/08* (2013.01);
(Continued)

(58) Field of Classification Search
None
See application file for complete search history.

(56) References Cited

U.S. PATENT DOCUMENTS 7,406,434 B1    7/2008    Chang
7,680,752 B1    3/2010    Clune, III
(Continued)

OTHER PUBLICATIONS

European Patent Office Supplementary European Search Report for Application No. EP 19919662, 7 pages, Nov. 29, 2022.
(Continued)

*Primary Examiner* — Eric Nilsson (57) ABSTRACT

A system and methods for multivariant learning and optimization repeatedly generate self-organized experimental units (SOEUs) based on the one or more assumptions for a randomized multivariate comparison of process decisions to be provided to users of a system. The SOEUs are injected into the system to generate quantified inferences about the process decisions. Responsive to injecting the SOEUs, at least one confidence interval is identified within the quantified inferences, and the SOEUs are iteratively modified based on the at least one confidence interval to identify at least one causal interaction of the process decisions within the system. The causal interaction can be used for testing, diagnosis, and optimization of the system performance.

20 Claims, 6 Drawing Sheets

(51) Int. Cl.

| | |
|---|---|
| *B60W 40/08* | (2012.01) |
| *B60W 40/105* | (2012.01) |
| *G05B 13/02* | (2006.01) |
| *G05B 19/4065* | (2006.01) |
| *G05B 19/418* | (2006.01) |
| *G05B 23/02* | (2006.01) |
| *G06F 18/21* | (2023.01) |
| *G06N 5/043* | (2023.01) |
| *G06N 5/046* | (2023.01) |
| *G06N 7/01* | (2023.01) |
| *G06Q 10/0631* | (2023.01) |
| *G06Q 10/0639* | (2023.01) |
| *G06Q 10/087* | (2023.01) |
| *G06Q 30/0202* | (2023.01) |

(52) U.S. Cl.
CPC ......... *B60W 40/105* (2013.01); *G05B 13/021* (2013.01); *G05B 13/024* (2013.01); *G05B 13/0265* (2013.01); *G05B 13/041* (2013.01); *G05B 19/4065* (2013.01); *G05B 19/41835* (2013.01); *G05B 23/0229* (2013.01); *G05B 23/0248* (2013.01); *G06F 18/2193* (2023.01); *G06N 5/043* (2013.01); *G06N 5/046* (2013.01); *G06N 7/01* (2023.01); *G06Q 10/06315* (2013.01); *G06Q 10/06395* (2013.01); *G06Q 30/0202* (2013.01); *G05B 2219/36301* (2013.01); *G06Q 10/087* (2013.01)

(56) References Cited

U.S. PATENT DOCUMENTS

| | | |
|---|---|---|
| 7,822,636 B1 | 10/2010 | Ferber |
| 8,688,518 B2 | 4/2014 | Ranka |
| 9,947,018 B2 | 4/2018 | Brooks |
| 2006/0111931 A1 | 5/2006 | Johnson et al. |
| 2006/0242288 A1 | 10/2006 | Masurkar |
| 2007/0244575 A1 | 10/2007 | Wojsznis et al. |
| 2009/0157442 A1 | 6/2009 | Tesler |
| 2009/0204267 A1* | 8/2009 | Sustaeta ................ G06Q 10/04 700/36 |
| 2010/0174671 A1 | 7/2010 | Brooks et al. |
| 2013/0218529 A1 | 8/2013 | Vikstrom et al. |
| 2014/0114746 A1 | 4/2014 | Pani |
| 2014/0289174 A1 | 9/2014 | Statnikov et al. |
| 2015/0142704 A1 | 5/2015 | London |
| 2016/0350796 A1 | 12/2016 | Arsenault |
| 2016/0353166 A1 | 12/2016 | Arsenault et al. |
| 2017/0205781 A1* | 7/2017 | Brooks ................ G05B 13/045 |
| 2017/0206467 A1 | 7/2017 | Brooks et al. |
| 2018/0076968 A1* | 3/2018 | Rosenberg ............ G06N 20/00 |

OTHER PUBLICATIONS

Alvarez, "Introduction to Adaptive Experimental Design," Center for Quantitative Sciences, Department of Biostatistics, Vanderbilt University School of Medicine, Oct. 12, 2012, 96 pages.

Dunn, "Multiple Comparisons Among Means," Journal of the American Statistical Association, Mar. 1961, vol. 56, No. 293, pp. 52-64.

Gomes, "Machine-Learning Maestro Michael Jordan on the Delusions of Big Data and Other Huge Engineering Efforts," IEEE Spectrum, Oct. 20, 2014, 10 pages.

Gershman, "Computational Rationality: A Converging Paradigm for Intelligence in Brains, Minds, and Machines," Journal of Science, Jul. 17, 2015, vol. 349, No. 6245, pp. 273-278.

International Search Report for PCT International Application No. PCT/IB2019/057673, mailed on May 12, 2020, 2 pages.

Jordan, "Machine Learning: Trends, Perspectives, and Prospects," Journal of Science, Jul. 17, 2015, vol. 349, 6245, pp. 255-260.

Shanks, "A Re-Examination of Probability Matching and Rational Choice," Journal of Behavioral Decision Making, Mar. 18, 2002, vol. 15, pp. 233-250.

Spiegelhalter, "The Future Lies in Uncertainty", Journal of Science, Jul. 18, 2014, vol. 345, No. 6194, pp. 264-265.

* cited by examiner

FIG. 6

DEEP CAUSAL LEARNING FOR CONTINUOUS TESTING, DIAGNOSIS, AND OPTIMIZATION

CROSS REFERENCE TO RELATED APPLICATIONS

This application is a national stage filing under 35 U.S.C. 371 of PCT/IB2019/057673filed Sep. 11, 2019, which claims the benefit of U.S. Provisional Application No. 62/818,816, filed Mar. 15, 2019, the disclosures of which are incorporated by reference in their entireties herein.

FIELD OF THE INVENTION

The present invention relates to multivariate learning and optimization processes to identify and utilize causal relationships between process decisions and outcomes and, more particularly, to concurrently performing these operations.

BACKGROUND

Multivariate learning is directed at transforming the basic building blocks of randomized controlled experimentation into fully automated processes that rationally exploit the natural variability in the timing, order, and specific parameters of decisions, self-organize experimental units, automatically generate causal knowledge regarding the system they are operating on, and simultaneously exploit that knowledge to continuously optimize expected utility. When applied to complex real-world systems with rapidly changing direction, magnitude, and spatial-temporal extent of the relationships among variables, multivariate learning and optimization provides a framework for decision making under uncertainty in a multitude of domains, including e-commerce, medicine, business, manufacturing, energy grids, power systems, transportation, data networks, swarm robotics, and infrastructure.

SUMMARY

Herein are disclosed systems, apparatuses, software and methods for multivariate learning and optimization processes.

A system for multivariant learning and optimization of an embodiment includes a memory and a processor coupled to the memory, where the processor configured to: receive one or more assumptions for a randomized multivariate comparison of process decisions, the process decisions to be provided to users of a system; repeatedly generate self-organized experimental units (SOEUs) based on the one or more assumptions; inject the SOEUs into the system to generate quantified inferences about the process decisions; identify, responsive to injecting the SOEUs, at least one confidence interval within the quantified inferences; and iteratively modify the SOEUs based on the at least one confidence interval to identify at least one causal interaction of the process decisions within the system.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

For the following Glossary of defined terms, these definitions shall be applied for the entire application, unless a different definition is provided in the claims or elsewhere in the specification.

Glossary

The terms independent variable (IV) and external variable (EV) are generally employed as, respectively, the variable manipulated by the user and the variable uncontrolled by the user. Independent variables and external variables may be discrete or continuous. EVs may be "IVs" that have been chosen to be outside the experimental control (e.g., to control the dimensionality of the search space). The term Dependent Variable (DV) is generally employed to refer to a variable that characterizes the response of the system to process decisions. It may be a direct measure of utility, one input to a complex utility function or may simply be representative of a state of system that may or may not be associated with some measure of utility. A DV may also represent an intermediate goal when a set of process decisions are taken sequentially. For example, DVs may often correspond to a sensor network that provides visibility into the responses of a complex system.

The term "level" as used with experimental units is generally employed as a status of a feature or option of the independent variable (IV). For example, a feature may be defined with two levels where a first level implies that the feature is active in the experimental unit and a second level is defined as it not being active. Additional states or statuses may then be defined beyond just active or not active for an IV. For example, the levels may be defined by discretizing a continuous IV.

The term "repeatedly" is generally employed as occurring constantly with or without a specific sequence. As an example, a process may constantly or iteratively follow a set of steps in a specified order or the steps may be followed randomly or non-sequentially. Additionally, steps may not all be executed with the same frequency, for example treatment assignment may be executed more frequently than updating the causal learning, and the frequency of the latter may change over time, for example as exploit phase becomes dominant and/or as computing capacity/speed requirements change over time.

"Exchangeable" or "exchangeability" is generally deployed as meaning statistically equivalent with respect to the outcome of process decision assignments.

The terms "causation" or "causal effect/relationship/interaction/inference" are generally used to refer to the effect of a process decision (e.g. IV level) relative to its absence on the process' dependent variables and/or its overall outcome/performance/utility.

"Positivity" is generally defined as meaning not less than zero or having a non-zero probability of occurrence or selection.

The terms "confound" and "confounding factor" are used to refer to variables that have an association with both the independent variables and the dependent variables, including the utility function. They are systematically eliminated through randomized selection of process decisions.

The terms "bias" and "biasing factor" include Hawthorne effects, order effects/carry over effects, demand characteristics, external variables, and/or any other factor that could modify the effects of the levels of the independent variable.

Unless otherwise indicated, all numbers expressing quantities or measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure.

Exemplary Embodiments

In general, humans and many machine learning implementations make decisions under conditions of probabilistic uncertainty. Recognition of patterns, inferences, or connections within a data set by passive observation is challenging without introducing conscious or unconscious bias or undisciplined assumptions. The data set may provide additional challenges as it may introduce 1) selection or sampling bias, 2) confounding variables, and 3) lack evidence of directionality. Controlled experimentation aims to eliminate confounds and bias by introducing randomization, blocking, and balancing aspects, yet remains impeded by the vast amount of a priori knowledge required to provide tangible outcomes (i.e., ensure high internal and external validity) and the inflexible constraints imposed by real-world decisions. Adaptive experimentation performs one or more steps in a sequential manner and often requires previous steps be concluded before a subsequent step may be addressed. The techniques described herein overcome passive observation and adaptive experimentation by transforming controlled and adaptive experimentation into non-sequential processes that repeatedly analyze data and optimize internal and external validity through self-organized experimentation. The self-organizing processes rationally exploit natural variability in the timing, order, and parameters of decisions to automatically quantify and definitively infer causal relationships with carefully controlled opportunity costs, where costs can include operational risk. Natural variability means uncertainty naturally leads to variance in decision making, as an example normal operating ranges in a manufacturing process. An advantage of the self-organizing adaptive learning system and methods over existing adaptive experimental techniques includes the ability to operate on impoverished input where conditions or interactions are initially unknown, incomplete, or hypothetical estimates and are learned over time. Another advantage is its robustness to false assumptions including the impact of time in non-stationary systems and processes, the optimum duration that process decisions should or could be implemented for, the optimum number of historical experiments that should or could be analyzed, and the effects of external factors (e.g., consumer fads or trends, seasonal variation, natural or manmade disasters, state of health, etc.). Iterative exploration of causal relationships that are spatiotemporally discontinuous (e.g., localized and/or delayed effects) is another advantage over existing techniques and of critical importance in understanding and optimizing process decisions with a level of granularity that is the most effectual for the specific domain of interest.

The system and methods deliver real-time and in-situ understanding and quantification of causation while providing fully automated operational control and integrated risk-adjusted multi-objective optimization. The behavior of the self-organizing system and methods is robust, efficient, scalable, and operationally effective on complex real-world systems including those that are subject to variance in spatial-temporal relationships, thus providing a general prescriptive analytics platform for cognitive automation.

General use cases include continuous testing and calibration (e.g., continuous tuning of the calibration parameters of a process control loop to minimize deviations from target), continuous diagnosis (e.g., continuous tuning of signal processing and classification parameters to minimize false positive/negative findings), and continuous optimization (e.g., continuous tuning of process decisions to maximize an objective function).

Embodiments include system and methods for optimizing objectives on multiple platforms and/or sub-systems (e.g., centralized vehicle-level process control unit for holistic optimization vs distributed sub-system/process control units). System inputs can include candidate actions, decisions, policies and systematic constraints (including soft and hard constraints such as safe/preferred process windows, physical limitations or response time requirements) for how and why process decisions can be combined and implemented. Inputs can also include initial assumptions regarding, for example, business objectives, historical context and previous discoveries/learnings (from previous implementation of Deep Causal Learning and/or other artificial intelligence (AI)/machine learning techniques, including learnings from observational/historical data), and time differentials between process decision implementation and its impact on process outcomes. Methods according to some embodiments can specify a protocol for combining and sequencing process decisions across space, time and other attributes. Other methods according to some embodiments can identify causal relationships between the implemented process decisions and system outcomes while optimizing overall utility (e.g., revenue, profit, overall health, efficiency, safety, reliability, and the like). The system can be configured to any objective function/goal as represented by human behavior, even when the underlying physical causal relationships/mechanisms are unknown. Deep Causal Learning can monitor causal effects on multiple dependent variables concurrently, while some may be part of the overarching objective function and others may be part of a local or intermediate response, constraint or objective function. As such, it combines the benefits of model-free reinforcement learning (estimation of the expected utility of decisions/actions on a final goal) and model-based reinforcement learning (estimation of cause and effect relationships independently of their utility/value). This allows the system to immediately and flexibly respond to changes in the utility function as a function of time (e.g., peak vs off-peak demand), space (e.g., different local operational objectives, constraints or risk tolerance) or other attributes.

Causation is measured as a statistically significant difference in outcomes associated with the presence relative to the absence of a process decision or setting on or within a group of self-organized experimental units. Differences in outcomes are computed and stored as d-scores and assessment of the statistical significance is accomplished by computing a confidence interval around the mean of each d-score distribution, which quantifies the expected value of the causal effect of the process decision or setting and the uncertainty surrounding it (and represents a measure or degree of inference precision). The computation of unbiased confidence intervals in this case is relatively straightforward because randomization eliminates any confounding factors and self-organized experimental units allow for biasing factors and effect modifiers to be self-identified and managed. Interpretation and adaptive use of the confidence intervals to automatically understand and exploit the specific effects of process decisions, timing, and duration allows for transparent and optimum regret management through probability matching. In particular, the computation of one or more confidence interval allows for risk-adjusted optimization since it quantifies the best and worst-case expected utility of the corresponding process decision. The combination of these causal learning, reinforcement learning and deep learning characteristics is what advantageously differentiates these system and methods from the limitations of current solutions. Methods and systems according to this invention can identify and adjust for false inputs (e.g., false assumptions) that would confound, bias and/or mask cause-and-effect knowledge and limit optimization results, as well as monitor and dynamically adapt to changes in causal relationships between process decisions and operational outcomes (e.g., as a result of equipment failure, wear and tear, weather event, etc.).

Figure 1:
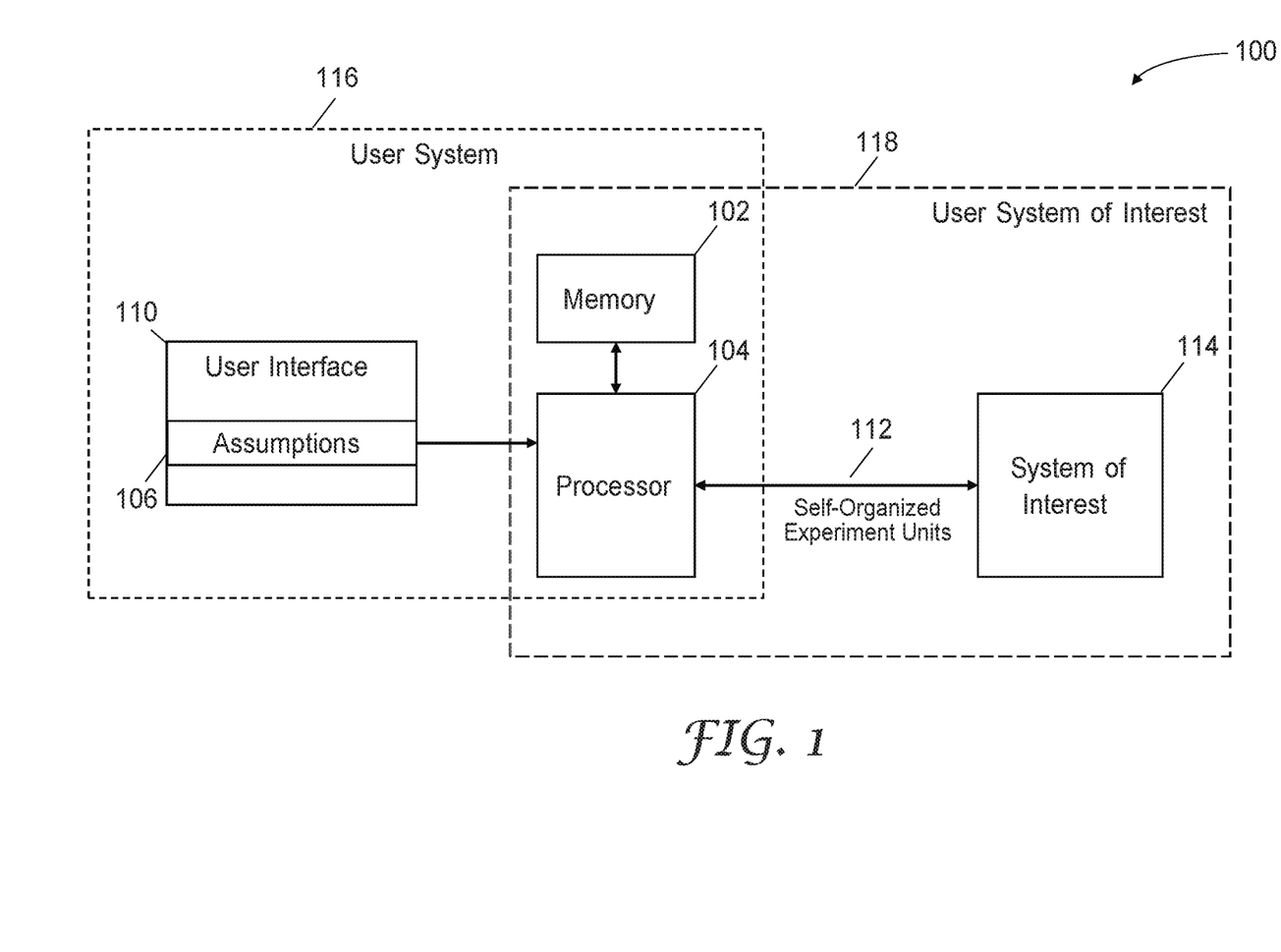
FIG. 1 is a diagram illustrating a system for multivariate learning and optimization according to various examples.

FIG. 1 is a diagram illustrating a system 100 for multivariate learning and optimization according to various examples. The system 100 includes a memory 102 and a processor 104 coupled to the memory 102. The processor 104 can receive inputs from a user interface 110 including one or more assumptions 106 for multivariate comparison of process decisions/settings. Assumptions 106 may also be retrieved from memory 102. Inputs can further include process decision/setting elements, which can also be stored in or accessed from memory 102. The process decisions/settings are to be provided to and optimized on a system of interest 114 to maximize a business objective.

Processor 104 and memory 102 may be part of a user system 116 that includes the user interface 110 from which to input assumptions 106. As an example, user system 116 may be a mobile device (e.g., smartphone, laptop, or other mobile device) or stationary device (i.e., desktop computer, server) running an application on the device or in a Cloud environment that displays the user interface 110 and connects to the system of interest 114 through a wired or wireless network. In another embodiment, the processor 104 and memory 102 may operate on a user system of interest 118. The user system of interest 118 would receive input from a user interface 110 that is operating on a mobile or stationary device miming an application on the device or in Cloud environment (e.g., an API running on a container or a virtual machine on the cloud). Assumptions 106 including process decision elements would be directly stored and processed in user system of interest 118. The user system 116 and user system of interest 118 may also operate concurrently implying that data is stored and processed interchangeably between them.

The processor 104 can repeatedly generate self-organized experimental units (SOEUs) 112 based on the one or more assumptions 106. The SOEUs 112 (which will be described in more detail later herein with respect to FIG. 3 and associated tables) are used to quantify inferences within and among the process decisions.

At least one SOEU 112 can include a duration for which the respective SOEU 112 is to be active in the system (e.g., the system of interest 114). In some embodiments, the processor 104 can generate a plurality of SOEUs 112 with durations randomly selected based on a uniform, Poisson, Gaussian, Binomial, or any other distribution. In other embodiments, the SOEUs' duration may be the longest allowed duration and all intermediate durations are simultaneously recorded. The processor 104 can also dynamically modify (i.e., increase or decrease) the latent duration between SOEUs 112 until carryover effects of an SOEU 112 on a subsequent SOEU 112 are diluted or substantially eliminated assuming effects are largely reversible. The processor 104 may increase or decrease durations of at least one SOEU 112 based on quantified inferences (e.g., progressively select durations that maximize statistical significance of measured effects) or in response to positive or negative results of the causal assessment (i.e., assessment of external validity by comparing the utility of exploit decisions vs baseline decisions where baseline decisions may be explore decisions as defined in greater detail with respect to FIG. 2).

The system of interest 114 can include websites or mobile applications. System of interest 114 can be, for example, enterprise management systems that optimize business-to-business (B2B) objectives, a production line, a vehicle control unit or any other complex and dynamic system. Each SOEU 112 can represent one instance of the system (e.g., a time slot on a single manufacturing line) or one element of a population (e.g., one car among a fleet of connected cars, one robot in a swarm). The processor 104 can group the SOEUs 112 into blocks or clusters based on quantified inferences of variance in the effects of process decisions across these experimental groups. Quantified inferences are based on the characteristics of the process decisions contained in individual SOEUs as well as the characteristics of the SOEUs themselves such as, time of year, geographic location, and other external variables. The processor 104 can identify distinct causal interactions for each cluster of SOEUs and therefore select optimal process decision within each cluster, enabling granular "personalized" process optimization. In some embodiments, knowledge of the causal effects of process decisions on a given system of interest 114 or set of SOEUs 112 can be transferred and/or generalized to a new system of interest or set of SOEUs with similar characteristics, taking advantage of the fact that causal learning is one of the most transferrable forms of learning. In other embodiments, multiple instances of Deep Causal Learning may be implemented simultaneously on distinct groups of SOEUs. In this case, transfer learning is complicated by the need to resolve any potential conflict that may exist between the multiple instances and their distinct causal models. This is achieved by taking advantage of the fact that Deep Causal Learning provides transparency regarding the quality of the learning, specifically the precision of learning through the confidence intervals and the accuracy of learning through baseline monitoring, which in turn provides an objective set of metrics to mediate and resolve conflict in learning and enable collaborative learning across SOEUs.

Once generated, the processor 104 can continually inject the SOEUs 112 into the system of interest 114, iteratively modify the SOEUs 112 according to methods and criteria described below with respect to FIG. 3, and identify at least one causal interaction of the process decisions within the system of interest 114. The processor 104 can assign decisions to SOEUs 112 initially uniformly and iteratively less uniformly proportionally to the amount of evidence of relative expected utility as quantified by the confidence intervals. In doing so, it ensures that every decision is optimally and automatically directed toward improving the objective function ("exploit decision") or toward improving the quality of learning ("explore decision").

The processor 104 can generate at least one group of SOEUs 112 based on a uniform probability distribution of the encompassing experimental units related to at least one assumption 106 with defined process setting, decision, and/or policy as described below.

Assumptions 106 can include objectives for the system of interest 114. The objectives can include risk-adjusted performance metrics that the system optimizes. Examples include, but are not limited to: efficiency, safety, reliability, life-time, and profit.

Assumptions 106 can include process control elements that identify process sub-systems or specific details. Examples include, but are not limited to: settings, thresholds, intrinsic characteristics, or combinations thereof.

Assumptions 106 can include temporal constraints or a specific constraint on process decisions. A temporal constraint can involve the time and the duration for which the decision would be active or inactive (e.g., when only appropriate at specific times of the day or the year) in the system. Constraints on decisions can include the presence or absence of a control variable, existing best practices, safety requirements, or combinations thereof.

Assumptions 106 can be initially defined and then recurrently updated, manually or automatically, as additional information becomes available, as the system analyzes and optimizes causal inferences, or as constraints and/or business/operational objectives change over time.

User interface 110 is a web or application-based, or cloud based, portal that the user accesses to enter assumptions 106 for the system. User interface 110 may be presented as a graphical user window on a monitor or smart phone display. A user would enter assumptions 106 through a keyboard or virtual keyboard on the device used to access the system.

Components of the system 100 may operate on a stationary (e.g., desktop computer or server) and/or mobile device (e.g., smart phone or laptop) while connected to the system through local, group, or Cloud based network. The one or more components of the system 100 may also operate on the stationary and/or mobile device after a connection and directions have been received by the system of interest 114.

Figure 2:
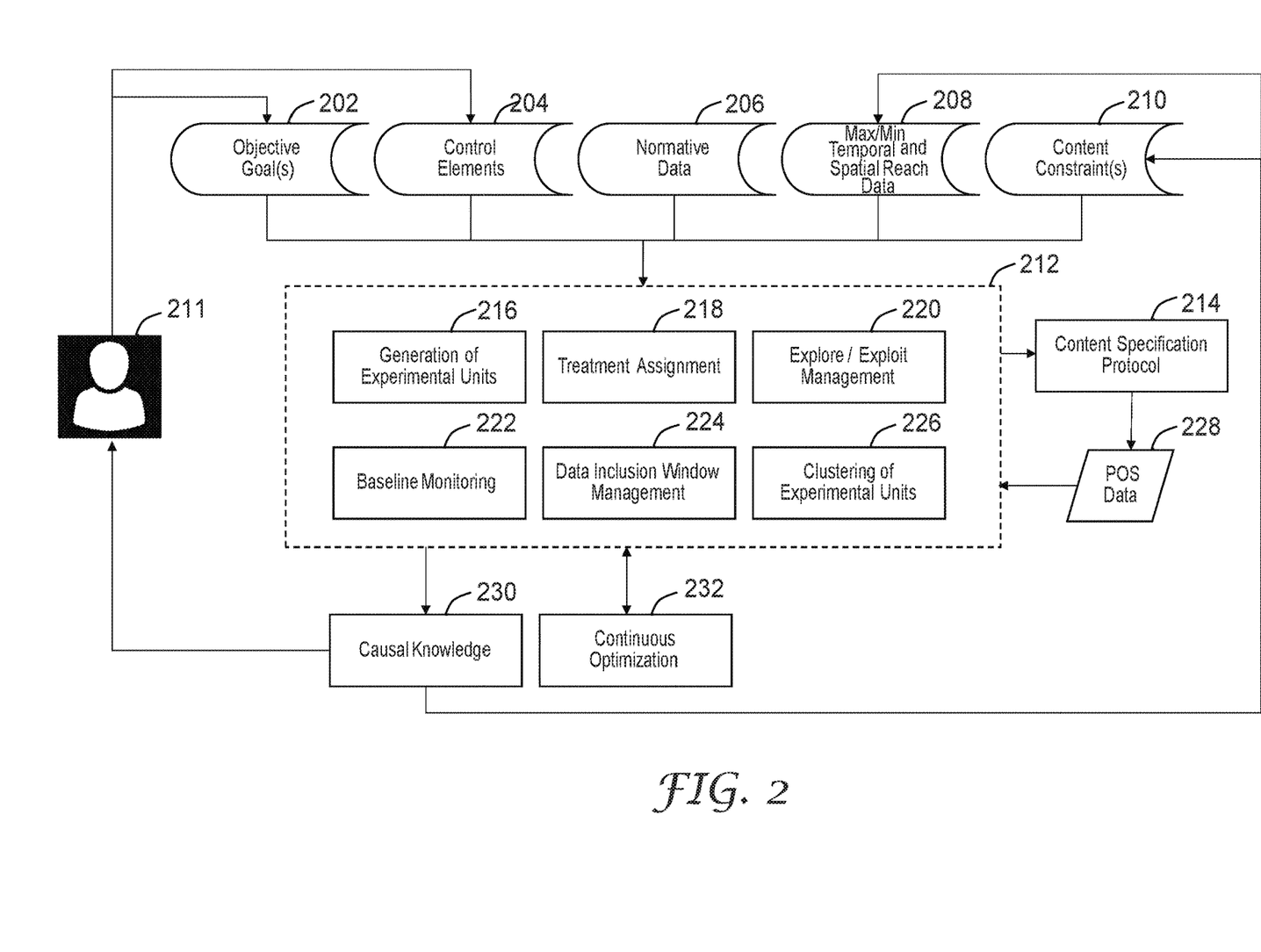
FIG. 2 is a block diagram of software modules and core processes for the system according to various examples.

FIG. 2 is a block diagram of software modules and self-organizing core processes for multivariate learning and optimization system 100 for execution by processor 104.

The software modules and self-organizing processes include: an objective goal(s) module 202; a process decision elements module 204; a normative data module 206; a max/min temporal reach data module 208; and a process decision constraints module 210. The objective goal(s) module 202, the process decision elements module 204, the normative data module 206, the max/min temporal reach data module 208, and the process decision constraints module 210 can provide enough structure to start generating SOEUs 112 (FIG. 1) without also requiring exhaustive, concrete detail and precision.

In some cases, the confidence intervals are also initialized based on historical data (whether observational or interventional like a DOE), for example for manufacturing applications where there might be higher reluctance to start from nothing. In some cases, the experiments are generated in advance as batches, for example when the response time is very short and the communication and/or computing power is limited, intermittent or at a premium.

Human supervisors or artificial intelligence (AI) agents 211 can adjust process control/decision elements and process constraints at any time before, during, and after the method implementation or when it is rational to do so, for example when the system and methods are operating at a maximum value of a boundary condition (as defined by a constraint) and the impact of the effect has not yet plateaued. In some embodiments, the processor 104 may provide (e.g., to a display device) indications of potential actions to be taken by a human supervisor or AI agent or may take such actions based on preset rules (e.g., increase the search space 10% at the boundary). Feedback or updates to assumptions or objectives may also be accepted manually or automatically (i.e., customer reviews or trends received by social media sites).

The processor 104 may additionally prompt or enable users to provide an on-going prioritized list or queue of candidate decisions/settings. One example includes when the dimensionality of the original search space is kept small based on evidence of the top importance variables (as identified through statistical analysis, random forest, Bayesian network or other) then refined over time. When such a queue is provided to the processor 104, the processor 104 can rationally introduce the new options when doing so will not negatively impact optimality. Similarly, candidate decisions/settings can be removed when the processor 104 detects that those options have little or no benefit, prompting human operators to review those options for removal.

The processor 104 can also adjust for the fact that the cost to change process controls may not be zero (e.g., time and labor). These costs can become part of the objective function and goals measured by the processor 104, thus allowing for resource allocation optimization where the cost of adding, removing or changing process controls is balanced with the perceived future/potential value.

The objective goal(s) module 202 receives, stores, displays, and modifies one or more performance metrics that the system will optimize. These goals can range from simple metrics (e.g., efficiency, life-time, reliability, sales, revenue, gross profit, cost of goods sold (COGS), etc.) to weighted combinations or any other functional transformation of multiple metrics (e.g., factoring complex cost factors, supply chain concerns, stock availability, etc.) and represent the dependent variables monitored during experimentation. They may represent an overall goal (e.g., total system efficiency) or local and/or intermediate goals (e.g., efficiencies of sub systems or efficiencies of sequential phases). Some of the metrics and their correspondingly user-assigned weights (i.e., importance values), if designated, can be combined into a multi-objective utility function. User assigned weights may be expressed as a number or a percentage. The multi-objective utility function may be modified or refined at any point in time when (or where) business objectives change (i.e., aggressive market penetration to maximize revenue, maximum power vs energy efficiency).

Control elements module 204 receives, stores, displays, and modifies user-provided control options including a full array of combinatoric search space of possible controls.

Control elements are specific instances of settings, actions, policies, etc. that define a control decision in technical or domain-specific language and represent the independent variables (IVs) available for experimentation. Control elements can be manually entered or updated through a user interface (i.e., user interface 110 of FIG. 1) or be automatically pasted, imported, copied, or uploaded into the system from another program application or platform (e.g., social media sites, process historians, databases, etc.). For example, control elements may comprise existing process tag names in an historian and their associated levels. In another example, control elements may comprise new elements never implemented before such as creative content elements generated by humans or generative adversarial networks. Importantly, control elements can be updated (e.g., added, deleted and/or modified) dynamically without affecting what the system has already learned, for example when the range of uncertainty in decision making and/or the process control constraints changes over time or, as another example, when an operator selects a sub-set of all possibilities based on constraints, best practices, existing knowledge or expert intuition. Control elements module 204 also receives, stores, displays, and modifies user-provided external variables (EVs) to be used by the self-organizing processes. External variables may be imported directly from another application (e.g., historian, weather services, sensor data, etc.) or may first be processes to extract relevant information (e.g., using natural language processing, sentiment analysis, filtering, statistical and machine learning analysis, etc.)

Normative data module 206 receives, stores, modifies, and represents past or historical process control variables and performance metrics (corresponding to the defined objective goal(s)) describing process control uncertainty under normal operational conditions and system/process performance prior to the implementation of the system. This data may be optionally used to initialize the system, including its initial decision variation or search space, and potentially also its initial learning so prior knowledge of utility (from prior implementation or from other techniques) can be incorporated. Normative data can be manually entered through a user interface (i.e., user interface 110 of FIG. 1) or be automatically imported, copied, or uploaded into the system from another program or platform (e.g., normal operating ranges from a manufacturing process historian).

Max/min temporal and spatial reach data module 208 receives, stores, modifies, and represents initial estimates of the maximum and minimum extent to which the causal effects of module 204 spread and decay throughout the system. Spread in this instance refers to the amount of time needed for changes in outcomes and dependent variables due to specific control elements to be detectable and therefore corresponds to the minimum amount of time that an experimental unit is activated. Decay in this instance refers to the amount of time for the outcome of specific control elements to substantially clear the system, (i.e., be undetectable under the assumption that the effects are reversible) and therefore corresponds to the minimum amount of time that an experimental unit is deactivated before another one is activated. In many instances, the effects may not be fully reversible (e.g., a battery naturally fades with each charge/discharge experiment, or a marketing campaign may impact future competitors' behavior/response) and the corresponding inferred causal effects may not be stable over time, in which case the data inclusion window (described further below) will adjust accordingly. A system-defined or user-defined experiment frequency and duration (be it time or a percentage of time) may also exist to specify when an experiment is active and inactive. This module is used to define the initial search space of the spatial and temporal characteristics of the experimental units.

Process decision constraints module 210 involves the set of user or system provided process control rules that restrict the overall combinatoric search space of control elements. The process control constraints module 210 receives, stores, modifies, and represents user or system defined constraints. Constraints include user-defined or system-specified rules, regulations, best practices and models that define the boundaries (or limitations) of allowed process control elements. Constraints may be "soft" and incorporated as a penalty function in the overall figure of merit (e.g. energy efficiency, life-time, etc.) or "hard" implying that the system will adhere (i.e., never violate) without deviation or consideration of other evidence. Constraints include but are not limited to: the time and location where process control elements can be implemented (e.g., overall system constraints vs. local sub-system constraints); constraints on multiplicity and co-occurrence (e.g., when process control elements cannot be repeated or used together); and constraints dictated by implementation platforms (e.g., level of automation and/or cost of implementation). Constraints can be updated during implementation as inferences are quantified, for example to explore the impact on utility at or near the boundaries. Process control elements and constraints are an opportunity for agents to manage risk versus reward by constraining or broadening the range of options available for experimentation in the system.

The objective goal(s) module 202, the process decision elements module 204, the normative data module 206, the max/min temporal reach data module 208, and the process decision constraints module 210 are used by the core algorithmic methods and processes 212 to generate a process control specification protocol 214 that defines the real-world process decisions/settings to apply at any given point in time. Processes 212 and content specific protocol 214 can each access Point Of Sale (i.e., sales per location) (POS) data 228. The core algorithmic methods and processes 212 include the following: a generation of experimental units process 216; a treatment assignment process 218; an explore/exploit management process 220; a baseline monitoring process 222; a data inclusion window management process 224; and a clustering of experimental units process 226.

Generation of experimental unit process 216 identifies exchangeable spatial-temporal units based upon input received from the core modules 202, 204, 206, 208, and 210. An ideal experimental unit is characterized by the smallest spatial/temporal extent that prevents carryover effects from degrading/biasing the causal knowledge generated. Examples of the generation and execution of experimental units, selection and use of independent and dependent variables, and assignment of spatial/temporal conditions are described, for example, in U.S. Pat. No. 9,947,018 (Brooks et al.) and U.S. Patent Application Publication No. 2016/0350796 (Arsenault et al.).

Treatment assignment process 218 provides controlled randomized assignment of process control elements to one or more experimental unit (such as double-blind assignment, randomization without replacement, counterbalancing, and blocking), with assignment frequencies following a uniform or pre-defined probability distribution (e.g., distribution associated with historical or normal operation) until variance in utility is detected, and exploited. At that point, control elements are assigned such that the relative frequency of assignment matches the relative frequency specified by the explore/exploit management process. The treatment assignment process manages clusters of exchangeable experimental units independently. Clustering involves isolating assignments per external factor, combination of external factors (e.g., as determined by principle component analysis), or combination of external factors states/values (e.g., as determined by conditional inference trees or other unsupervised classification methods) that have been identified as effect modifiers. Within each cluster, blocking can be used to further reduce variability due to external factors, for example by assigning the presence and absence of a control element to a pair of similar experimental units as determined by propensity matching. Both clustering and blocking contribute to eliminating variability and bias from potential effect modifiers and both are integral parts of the "self-organization" process.

Carryover effects of process control assignments within experimental units are operationally and adaptively managed by processes 216 and 218. Carryover effects imply that the effect of one process control assignment contaminates the measured effect of the next assignment. To eliminate carryover effects, the duration of assignments must comply with the max/min temporal reach of the effects. For example, if min=0 h and max=4 h, then experimental units may be generated with a duration of 4 h and a frequency of ⅛ (e.g., use the last 4 h during an 8-h period). In another example, if min=4 h and max=4 h, then experimental units may be generated with a duration of 1 h and a frequency of ⅕ (e.g., use the last hour during a 5-h period). The optimum experimental unit duration and frequency may also be dependent on whether the effects are persistent (i.e. stable over time within the duration of the experiment) or transient (i.e., changes over time within the duration of the experiment).

Explore/exploit management process 220 analyzes confidence interval and uses probability matching, rational choice theory, or other techniques to adjust assignment frequencies. With each new assignment, the system needs to decide whether to allocate the experiment toward making the most probabilistically optimal decision (i.e., maximizing reward) or toward improving the precision of the probability estimate (i.e., minimizing regret). In some instances, process 220 may adjust assignment frequencies based on the overlap between confidence intervals where smaller overlaps between confidence intervals result in more frequent use of the level associated with the highest utility. The system can also vary the aggressiveness of the exploit assignments and place it under experimental control to find the aggressiveness parameter that maximizes utility relative to the explore assignments as determined through baseline monitoring. Monitoring the utility gap between exploit and explore assignments provides an objective measure of optimality of the system's hyperparameters. When the cost (including risk and opportunity cost) for implementing process decisions is non-uniform across independent variable levels, Bonferroni-corrected confidence intervals are computed such that more evidence is required to exploit more risky or expensive control elements.

Baseline monitoring process 222 continuously analyzes one or more baseline in real-time through periodic random assignments to provide an unbiased measure of utility improvement. Baseline may be defined differently depending on what metric is desired to quantify, for example baseline may be defined as pure explore when inferring the utility of the system's hyperparameter or may be defined as an incumbent decision making process when inferring the utility of the explore/exploit assignments. In addition to experimental units being allocated as described above, the system continuously determines through statistical power analysis the number of baseline experimental units needed to accurately monitor the difference in performance between these baseline assignments and the explore/exploit assignments, or between explore and exploit. Baseline experimental units are randomly sampled according to the normative operational range data. The baseline monitoring process provides an unbiased measure of utility of internal hyperparameters such as clustering granularity, data inclusion window and explore/exploit aggressiveness, allowing such parameters to be objectively and dynamically tuned. The baseline trials also ensure that the entirety of the search space defined by the constraints is explored, thus providing a solution to the problem of optimization in a non-convex space.

Data inclusion window (DIW) management process 224 analyzes the impact of time on the stability of the strength and direction of interactions between the independent variables and the utility function and thus the extent to which data are representative of the current state of the system for real-time decision support. For each independent variable, it identifies a pareto-optimum data inclusion window that provides a trade-off between precision (maximizing experimental power and narrowing confidence intervals) and accuracy (maximizing statistical significance of causal effects and maintaining high external validity). Exemplary ways to identify the pareto-optimum data inclusion window include stepwise analysis of variance (ANOVA), normality testing and other statistical models. Confidence intervals are computed over this pareto-optimum data inclusion window to prevent the process from over-fitting the data and allow it to remain highly responsive to dynamic changes in the underlying causal mechanisms. The DIW may be user defined initially based upon the inputted constraints or prior knowledge about the system. In general, the system operates on the presumption of instability (i.e., it is not 100% stationary) and uses baseline monitoring to further optimize the balance between precision and accuracy.

Clustering of experimental units process 226 conditionally optimizes SOEU injections and process control assignments to eliminate the influence of effect modifiers (external factors outside of experimental control) and provide unbiased evidence of causal interactions within each cluster. Clustering involves isolating assignments per individual external factor, combination of external factors (e.g., as determined by principle component analysis), or combination of external factors states/values (e.g., as determined by conditional inference trees or other unsupervised classification methods) that act as effect modifiers. Furthermore, in some embodiments, the external factors may first be transformed (e.g., by trend and seasonality analysis and other techniques) into a different set of factors prior to clustering. Clustering is also used to manage dimensionality in the system by learning how to conditionally assign independent variable levels based on the factorial interactions between their effects and the attributes of the experimental units that cannot be manipulated by the system (e.g., seasonal or weather effects, etc.). The dimensionality of the system and consequently the granularity of the learning (i.e., the number of clusters) is always commensurate with the amount of data available such that adding more external factors does not necessarily increase dimensionality as they will be ignored until evidence supports the need for clustering. Therefore, there is no limit on how many external factors could or should be considered and generally the more is known about the characteristics of the experimental units, the more effective the processes are at enforcing exchangeability and eliminating bias from effect modifiers. External factors with large effects are identified and clustered first, while others are managed through blocking (e.g., by propensity matching) until enough data has accumulated to cluster further. Initial assumptions include what external variables and experimental unit characteristics should be considered based on a-priori knowledge or evidence that they in fact matter. Clustering is achieved by pooling experimental units into clusters with maximum within-cluster similarity of the effects of independent variables on utility (i.e., greater exchangeability) and maximum between-cluster difference as identified using factorial ANOVA, independence testing, conditional inference trees, or other unsupervised classification techniques. As in the case of the explore/exploit management process and the data inclusion window mandecision constraints modules (FIGS. 2-202, 204, 206, 208, and 210) to define variables and experimental unit breadth. The explore/exploit phase starts adjusting experimental unit duration, data inclusion window and assignment frequencies and assesses the utility of these adjustments through baseline monitoring. The cluster initiation phase starts exploiting variance in measured effects across external factors to improve exchangeability of experimental units and granularity of learning. The continuous cluster optimization phase dynamically manages the self-organization of experimental units and assesses its utility through baseline monitoring. Although the phases are described sequentially, it should be understood that they may not always be executed in this particular order and that two or more phases may initiate or execute concurrently.

TABLE 1

Core Algorithmic Methods and Processes Implementation by Phase

| Phase | Experimental Unit Generation FIG. 2-216 | Treatment Assignment FIG. 2-218 | Data Inclusion Window Management FIG. 2-224 | Clustering of Experimental Units FIG. 2-226 | Explore/Exploit Management FIG. 2-220 |
|---|---|---|---|---|---|
| Initiation | Vary SOEU size. Check if the size/frequency of experiments is changing over time | Assign treatment matching normative operational frequencies | DIW extends to start | Define one cluster | Pure exploration |
| Explore/Exploit | Continue to vary and adjust SOEU size. Check if the size/frequency of experiments is converging. | Assign using probability matching. Possibly use a measurement of bias in learning | Vary DIW to maximize delta between baseline and explore/exploit trials. For example, discount older data or find evidence of over/under fitting the data. | Maintain one cluster | Optimize ratio of pure explore versus explore trials to find reliable delta between classes |
| Cluster Initiation | Continue to vary and adjust SOEU size per cluster. Check if the size/frequency of experiments is different under different external factors and changes over time. | Assign using probability matching exponent, adjust exponent based on delta between pure explore vs. explore/exploit hybrid. Check for baseline monitoring through assignments. | For each cluster, vary DIW to maximize delta between baseline and explore/exploit. Check for baseline monitoring. | Define three clusters (one pure benchmark and the others by IV). Possibly monitor by changes in granularity of assignments. | For each cluster, optimize ratio of pure explore versus explore trials to find reliable delta between classes Possibly run "baseline" on historical data to see what it would show. |
| Continuous Cluster Optimization | | | | Vary clusters | | agement process, the number of clusters can be dynamically optimized to maximize both precision and precision by placing it under experimental control and continuously testing its impact on utility through baseline monitoring. In some cases, precision and accuracy may both benefit from clustering, whereby clustering reduces both the variance and sampling bias in the estimate. In some other cases, precision and accuracy may both improve by recombining clusters as evidence of utility changes over time, not unlike how humans dynamically form memories in their brains.

Table 1 illustrates how each of the core algorithmic methods and processes 212 (FIG. 2) can operate by phase once the system is implemented. Phases are defined as initiation, explore/exploit, cluster initiation, and continuous cluster optimization. The initiation phase occurs as soon as assumptions 106 (FIG. 1) have been inputted and defined. Assumptions 106 can include or comprise processes 202, 204, 206, 208, and 210. The system begins to analyze data contained in the objective goals, process decision elements, normative data, max/min temporal reach data, and process Causal knowledge module 230 systematically executes the core algorithmic methods and processes 212 to compute confidence intervals around the causal effects of process control assignments, representing the expected utility of these effects on the multi-objective optimization function and the uncertainty around these estimates. Confidence intervals are computed in the causal knowledge module 230 from d-score distributions calculated for each independent or combinations of independent variable levels and each dependent variable within each cluster of exchangeable experimental units. Deep Causal Learning captures not just individual effects but also interaction effects between IVs and does not assume that effects are simply additive. Although one metric for multi-objective optimization is needed, computing confidence intervals for each dependent variable in the objective function can be used to provide greater transparency and interpretability of the learning, and to allow for the objective function to be changed on the fly by providing a causal model independent of rewards/utility. In doing so, Deep Causal Learning combines the benefits of model-free and model-based reinforcement learning.

Confidence intervals are calculated by statistical testing on the differences between the measured effects when a variable is activated and when it is deactivated (i.e., d-scores) over the data inclusion window. There may be a specific data inclusion window per independent variable and per cluster (i.e., they may all be identical or distinct). Incremental value of learning versus exploiting (i.e., how much more value is there to capture probabilistically by narrowing down the confidence intervals) is continually assessed, including the potential impact of adding, editing, interpolating, or removing independent variables.

Continuous optimization module 232 evokes processes to identify, monitor, and improve upon the clustering of experimental units process 226 and explore/exploit management process 220 by further refining the effectiveness of the recommended control elements and the system's hyperparameters.

Figure 3:
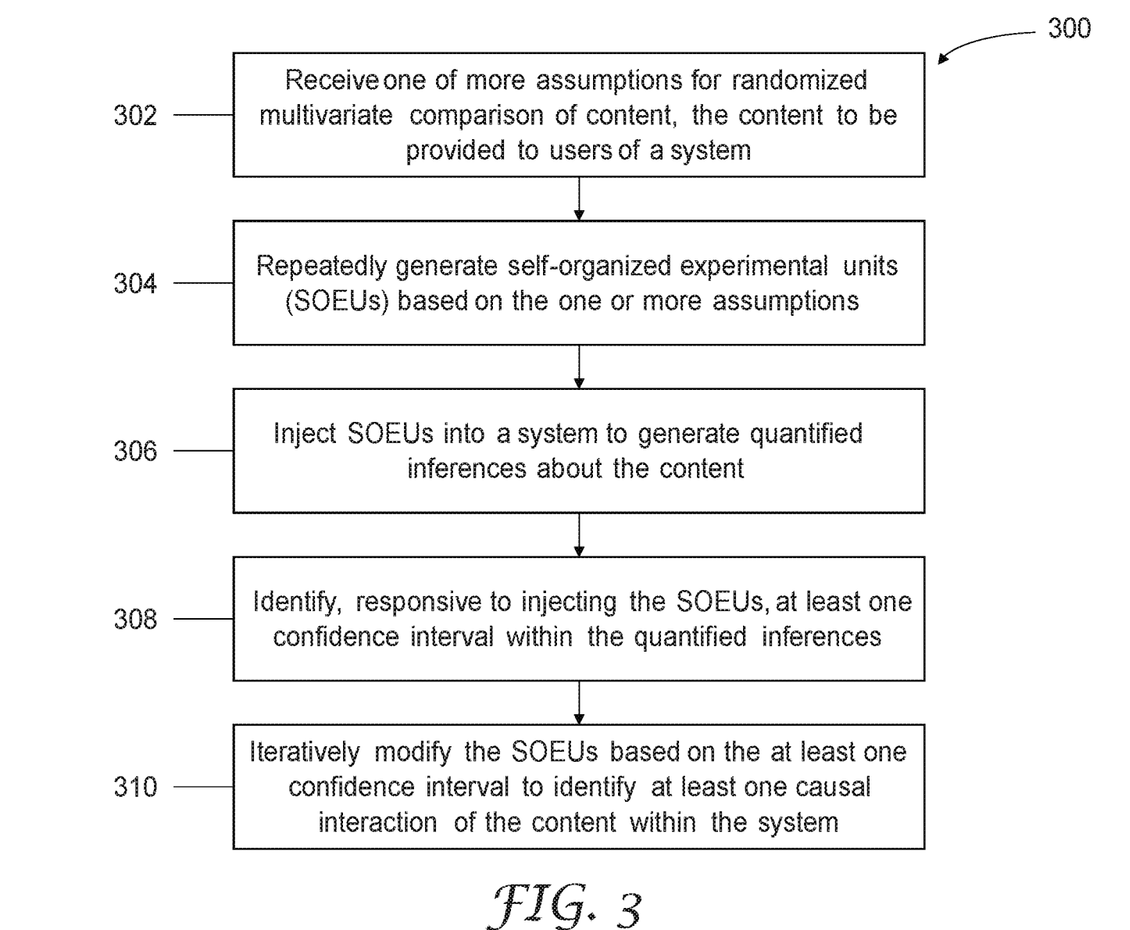
FIG. 3 is a flow chart of a computer-implemented method for multivariate learning and optimization according to various examples.

FIG. 3 is a flow chart of a computer-implemented method 300 for process decision generation and optimization according to various examples. Method 300 can be implemented in software or firmware for execution by a processor such as processor 104. Method 300 includes the following steps: receive one or more assumptions for randomized multivariate comparison of content, the content to be provided to users of a system (302), where the users can be an agent operating on a process with the agent being human-mediated or automated or both; repeatedly generate SOEUs based on the one or more assumptions (304); inject SOEUs into a system to generate quantified inferences about the content (306); identify, responsive to injecting the SOEUs, at least one confidence interval within the quantified inferences (308); and iteratively modify the SOEUs based on the at least one confidence interval to identify at least one causal interaction of the content within the system (310).

Figure 4:
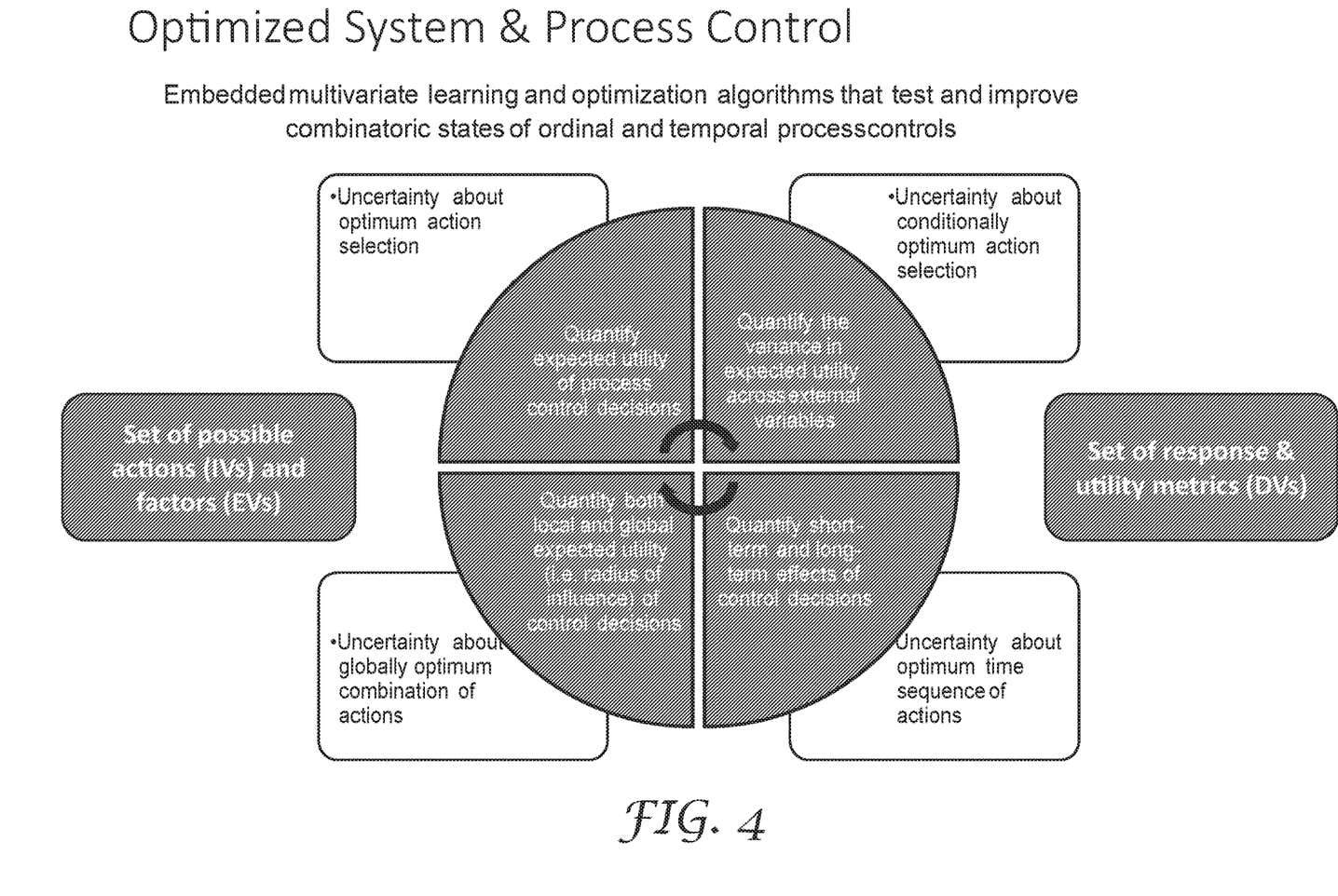
FIG. 4 is a flow chart of a computer-implemented method for optimizing combinatoric states and temporal processes.

FIG. 4 is a flow chart of a computer-implemented method for optimizing combinatoric states of ordinal and temporal process controls under uncertainty.

Figure 5:
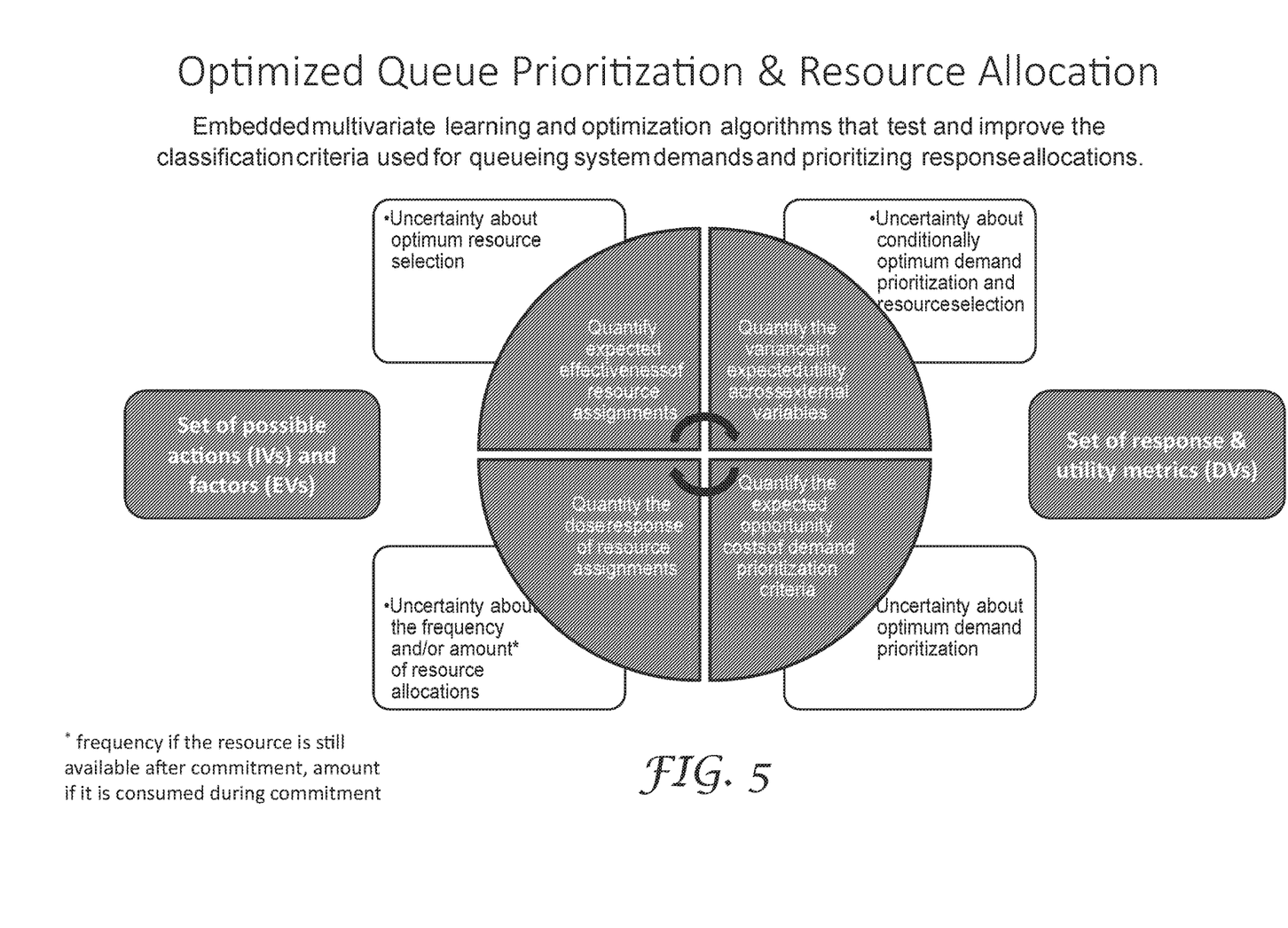
FIG. 5 is a flow chart of a computer-implemented method for optimizing queue prioritization and allocating resources.

FIG. 5 is a flow chart of a computer-implemented method for optimizing queue prioritization and resource allocation under uncertainty.

Figure 6:
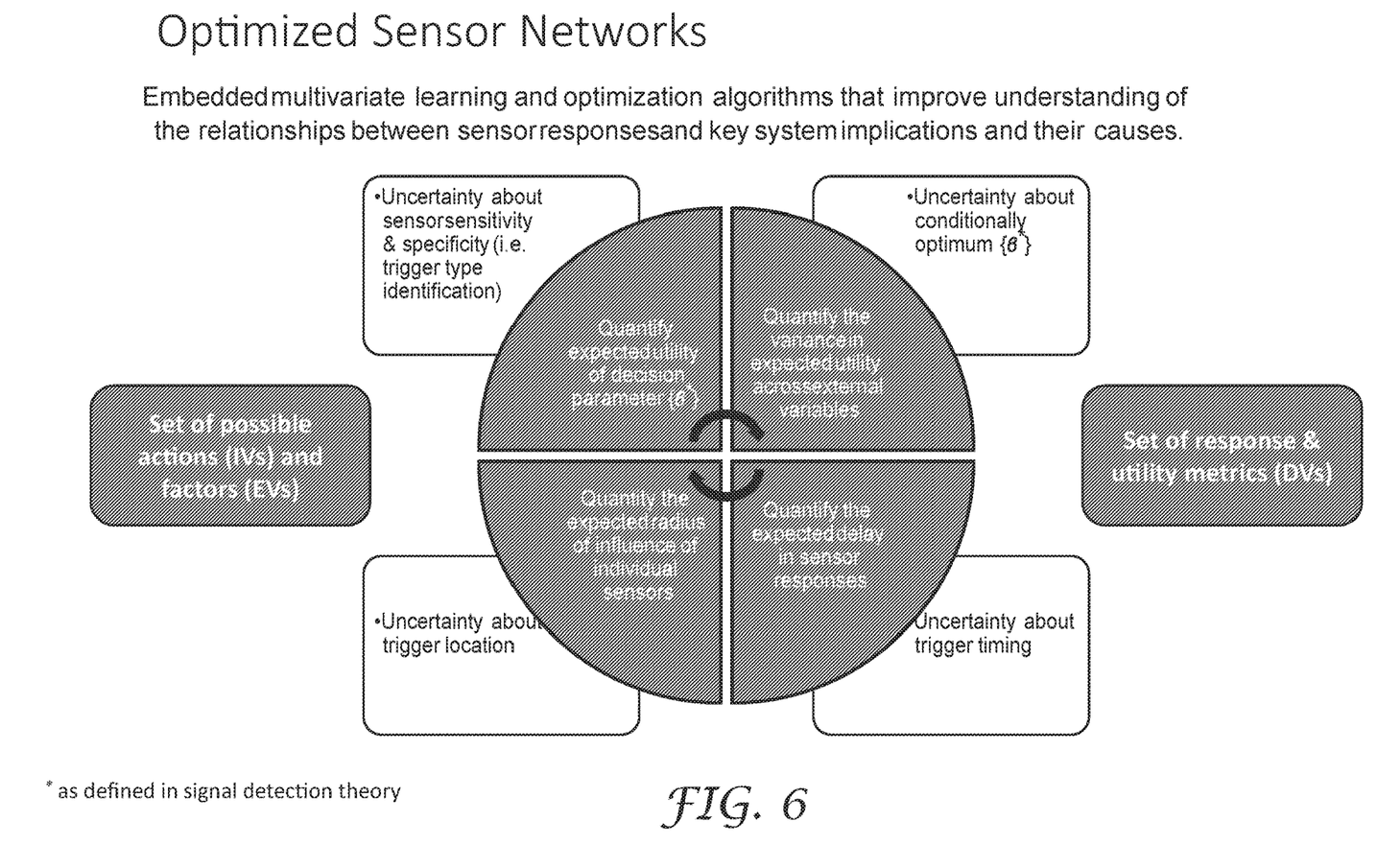
FIG. 6 is a flow chart of a computer-implemented method for optimizing sensor networks, relationships, and outcomes resulting from interactions.

FIG. 6 is a flow chart of a computer-implemented method for optimizing sensor network topography, calibration and/or interpretation under uncertainty.

The system and methods can include a robustness to false assumptions and initialization of causal knowledge from association strength (i.e., correlations) that becomes corrected over time.

The system and methods can include "model-free" operation, for example with no need to know the underlying causal diagram or process mechanisms (e.g., certain chemical reactions like electro-chemical fluorination). The system and methods can also include a "model-based" operation, for example when the causal learning provides a mathematical representation of the physical connections and causal mechanisms in the system analogous to a "digital twin" (unlike correlations that exists between everything and anything, including where there is no physical connection and/or no causal link).

The system and methods also anticipate and respond to error (estimation).

What is claimed is:

1. A system for multivariate learning and optimization, comprising:
   memory; and
   a processor coupled to the memory, the processor configured to:
   receive one or more assumptions for a randomized multivariate comparison of process decisions, the process decisions to be provided to users of a system;
   repeatedly generate self-organized experimental units (SOEUs) based on the one or more assumptions;
   inject the SOEUs into the system to generate quantified inferences about the process decisions;
   identify, responsive to injecting the SOEUs, at least one confidence interval within the quantified inferences;
   compute the at least one confidence interval by statistical testing on d-scores, which are defined as differences between measured effects when a variable is activated and when it is deactivated; and
   iteratively modify the SOEUs based on the at least one confidence interval to identify at least one causal interaction of the process decisions within the system.

2. The system of claim 1, wherein the causal interaction is used for testing and improving upon combinatoric states of ordinal and temporal process controls.

3. The system of claim 1, wherein the causal interaction is used for queueing system demands and allocating responses.

4. The system of claim 1, wherein the causal interaction is used for testing and improving sensor network topography, calibration and interpretation.

5. The system of claim 1, wherein the SOEU duration and other characteristics are perturbed over time to minimize temporal and spatial interactions and maximize independence of SOEUs.

6. The system of claim 1, wherein SOEU characteristics are used to optimize cluster assignment and improve exchangeability of SOEUs within each cluster.

7. The system of claim 1, wherein an amount of data used to generate quantified inferences (DIW) is proportional to the stability of the causal interaction in time.

8. The system of claim 7, wherein the DIW is less than a total amount of data available by 10%, 20%, 40%, or 80%.

9. The system of claim 1, wherein an objective function of the system changes over space and/or time.

10. The system of claim 1, wherein random assignments are used for baseline monitoring of the system.

11. The system of claim 10, wherein the baseline monitoring is used to objectively tune or optimize hyperparameters of the system.

12. The system of claim 1, wherein the confidence interval provides an unbiased estimate of physical cause and effect relationships.

13. The system of claim 1, wherein
   clustering and blocking are part of how the experimental units are self-organized, and
   clustering and blocking are utilized to eliminate variability and bias from potential effect modifiers.

14. The system of claim 13, further comprising a specific data inclusion window per independent variable and per cluster.

15. The system of claim 13, wherein an incremental value of learning versus exploiting is continually assessed.

16. The system of claim 15, wherein the continually assessing further comprises assessing a potential impact of adding, editing, interpolating, or removing independent variables.

17. The system of claim 1, further comprising a continuous optimization module configured to identify, monitor, and improve clustering of experimental units process and explore/exploit management by further refining the effectiveness of recommended control elements and the system's hyperparameters.

18. The system of claim 1, further comprising model-free operation wherein there is no need to know the underlying causal diagram or process mechanisms.

19. The system of claim 1, further comprising model-based operation wherein causal learning provides a mathematical representation of physical connections and causal mechanisms in the system.

20. A computer-implemented method comprising:
injecting randomized controlled signals into the system of interest;
ensuring the signal injections occur within normal operational ranges and constraints;
monitoring at least one performance measure of the system of interest in response to the controlled signals;
computing confidence intervals about the causal effect of the presence relative to the absence of distinct signal injections on the performance measure of the system of interest;
selecting optimal signals for the performance of the system of interest based on the computed confidence intervals; and
computing confidence intervals by statistical testing on d-scores, which are defined as differences between measured effects when a variable is activated and when it is deactivated.

* * * * *